Aug. 30, 1932.    J. M. ZDEB    1,874,148
PLANE
Filed Sept. 14, 1929
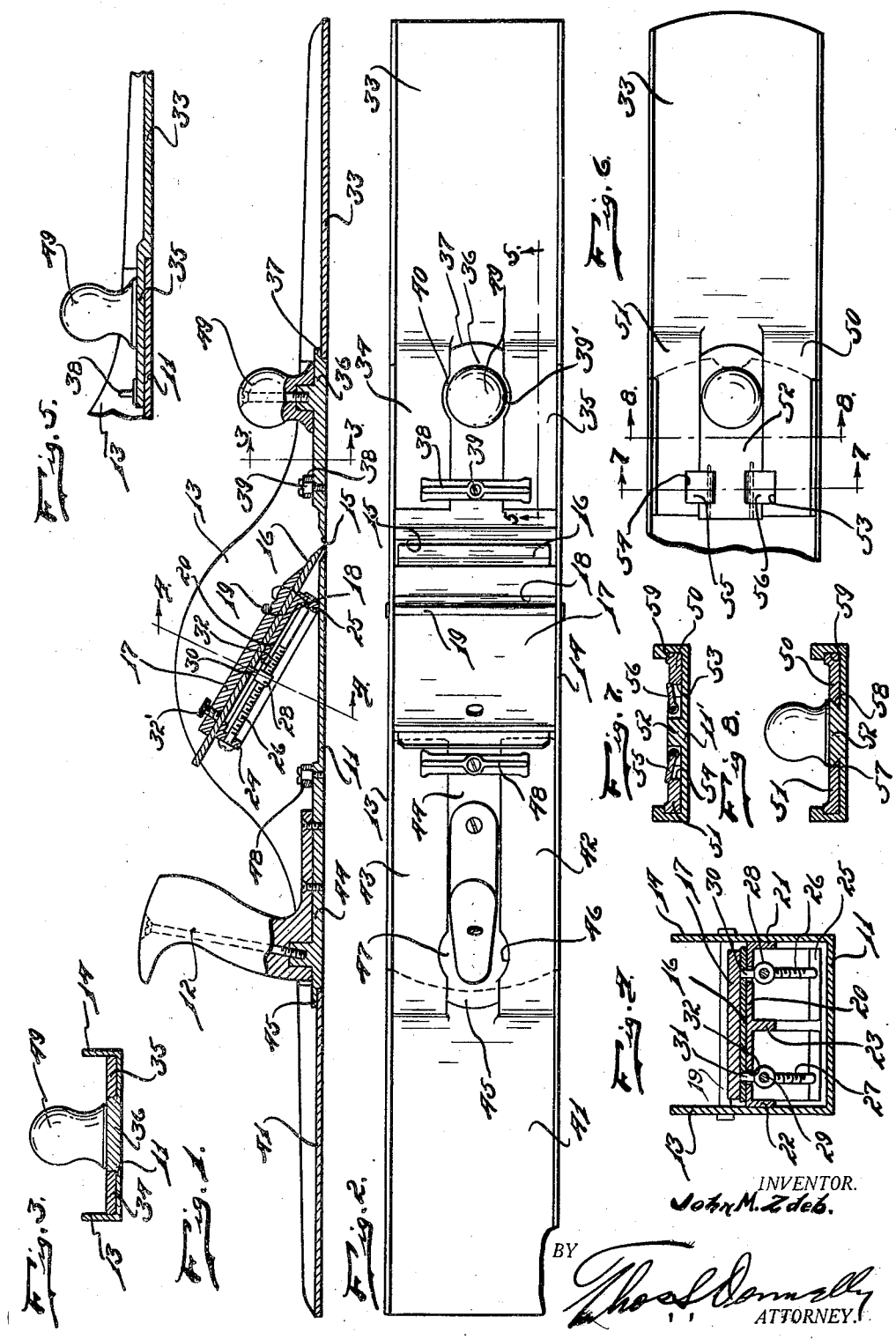
INVENTOR.
John M. Zdeb.
BY
Thos L Donnelly
ATTORNEY.

Patented Aug. 30, 1932

1,874,148

UNITED STATES PATENT OFFICE

JOHN M. ZDEB, OF DETROIT, MICHIGAN

PLANE

Application filed September 14, 1929. Serial No. 392,709.

My invention relates to a new and useful improvement in a plane and has for its object the provision of a plane which may be easily and quickly adjusted to various lengths so that the artisan using a plane may in one tool have a plane adapted for various kinds of work thus eliminating the necessity of being provided with a plurality of planes of various lengths.

Another object of the invention is the provision of means for securing extensions on a plane and retaining the same in proper alignment.

Another object of the invention is the provision of means for mounting a plane blade into position so that it may be easily and quickly adjusted for the various kinds of work.

Another object of the invention is the provision of a plane of this class which will be simple in structure, economical of manufacture, and highly efficient in use.

Other objects will appear hereinafter.

The invention consists in the combination and arrangement of parts hereinafter described and claimed.

The invention will be best understood by a reference to the accompanying drawing which forms a part of this specification and in which, Fig. 1 is a longitudinal vertical sectional view of the invention with parts shown in side elevation.

Fig. 2 is a top plan view of the invention.

Fig. 3 is a sectional view taken on line 3—3 of Fig. 1.

Fig. 4 is a sectional view taken on line 4—4 of Fig. 1.

Fig. 5 is a fragmentary sectional view taken on line 5—5 of Fig. 2.

Fig. 6 is a fragmentary top plan view of a modified form of the invention.

Fig. 7 is a sectional view taken on line 7—7 of Fig. 6.

Fig. 8 is a sectional view taken on line 8—8 of Fig. 6.

The invention comprises a plane base 11 having a handle 12 and side walls 13 and 14 projecting upwardly therefrom. Formed in the base 11 is the opening 15 through which the sharpened end of the blade 16 may project. Positioned upon, and engaging the upper surface of, the blade 16 is a plate 17 having transversely extending grooves 18 in which engages the bolt 19 projected through the side walls 13 and 14.

Secured between the side walls 13 and 14 is a supporting plate 20 having at opposite sides the flanges 21 and 22 to provide a U shaped structure. A central rib 23 projects outwardly from the plate 20 between the flanges 21 and 22. End flanges 24 and 25 project downwardly from the plate 20. Rotatably mounted in these flanges 24 and 25 are screws 26 and 27 which project through nuts 28 and 29, projecting upwardly from which are trunnions 30 and 31 which project through slots 32 formed in the plate 20 and extend into the openings formed in the blade 16. By rotating the screws 26 and 27 the blade may be moved upwardly or downwardly, depending upon the direction of rotation, so that the blade may be adjusted to the various positions required for the different kinds of work. Threaded through the plate 17 is a set screw 32' which will serve to lock the plate in its various positions. For work requiring a short plane the base 11 is sufficient. For work requiring a longer plane I have provided extensions which may be mounted on the base 11. The forward extension 33 is provided with a pair of upwardly offset tongues 34 and 35 which are spaced apart and adapted to embrace a central tongue 36 on the base 11, a portion 37 of this central tongue overlapping the edge of the base of the extension 33. A cross-bar 38 is secured by a screw 39 on the base 11 and may be tightened in position so as to lock the tongues 34 and 35 in embracing relation on the tongue 36. Each of the tongues 34 and 35 is provided with an arcuate recess 39' in which engages the circular boss 40 formed on the tongue 36. The engagement of the boss 40 in the recess 39 will prevent relative longitudinal movement of the extension 33 and the base 11, and the cross-bar 38 will prevent movement of the extension 33 vertically relatively to the base 11.

The rearward extension 41 is provided with a pair of tongues 42 and 43 which embrace the central tongue 44 on the base 11, this tongue having a portion 45 overlapping the edge of the extension 41 and engaging in the recess 46 is the circular boss 47 carried by the tongue 44. A cross-bar 48 is secured by a screw to the tongue 44 and may be positioned to engage the tongues 42 and 43 to cooperate with the boss 47 for locking the rearward extension 41 in relation to the base 11. A hand hold 49 is mounted on the forward end of the base 11.

With a plane constructed in this manner the extension may be very easily and quickly attached in position and held in alignment with the base 11 so that as efficient work is accomplished with a plane of this kind as is performed with a one piece plane.

In the modified form shown in Fig. 6 the extension 33 is provided with the tongues 50 and 51 which embrace the central tongue 52. Formed in the tongues 50 and 51 are recesses 53 and 54. Carried by the tongue 52 are pivotally mounted dogs 55 and 56 which, when the extension is moved into position, may be swung on their pivots to engage and lie in the recesses 53 and 54, thus locking the parts against longitudinal relative movement. As shown in Fig. 8 the edges of the tongue 52 are beveled and the edges 57 and 58 of the tongues 50 and 51 are also inclined to provide a dove-tail connection, the outer edges of the tongues 50 and 51 engaging in the channels 59 so that when the tongues are moved into operative position the parts are securely held in fixed relation.

While I have illustrated and described the preferred form of my invention, I do not wish to limit myself to the precise details of structure shown but desire to avail myself of such variations and modifications as come within the scope of the appended claim.

Having thus described my invention, what I claim as new and desire to secure by Letters Patent is:

A plane of the class described, comprising: an engaging base; a raised tongue extending longitudinally of said base centrally thereof at one end; an extension for said base; a pair of tongues projecting in spaced relation outwardly from opposite sides of one end of said extension and upwardly offset from the base thereof for overlying said engaging base and embracing said tongue on said base, said tongues on said extension having a recess formed in opposite faces; a projection on said centrally positioned tongue for engaging in said recesses and resisting relative longitudinal movement of said engaging base and said extension; and movable means carried by said centrally positioned tongue engageable with the upper faces of said spaced tongues for resisting movement of said tongues relatively to said engaging base.

In testimony whereof I have signed the foregoing specification.

JOHN M. ZDEB.